Patented June 20, 1944

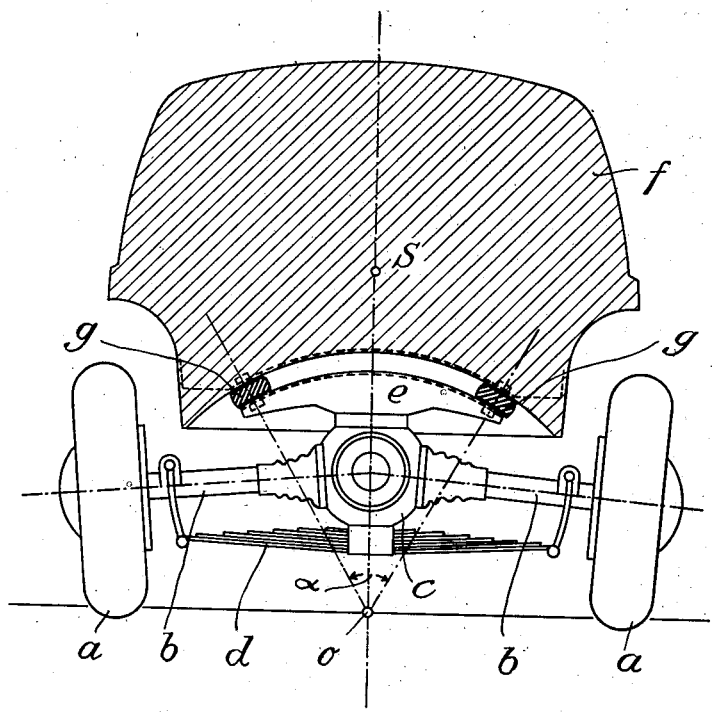

2,352,054

UNITED STATES PATENT OFFICE 2,352,054

MOVABLE CONNECTION OF A VEHICLE BODY WITH THE CHASSIS OR AN AXLE AGGREGATE

Karl Wilfert, Sindelfingen, and Béla Barényi, Vaihingen-Rohr, Germany; vested in the Alien Property Custodian Application October 8, 1941, Serial No. 414,146
In Germany June 6, 1940

6 Claims. (Cl. 280—106.5)

The present invention relates to a resilient connection of the vehicle body with the chassis or an axle aggregate of a vehicle.

Motor vehicles are known in which the car body is resiliently connected to the chassis or to the axle aggregates in such a manner that the car body may oscillate with regard to the chassis or to the vehicle axles. However in connection with oscillating axles, more especially with oscillating halfaxles which strongly alter the gauge, rocking phenomenons, due to transverse shocks transmitted to the car body and occurring in the axle joints, may be produced which are the stronger, the higher the longitudinal axis of oscillation of the car body is arranged and the nearer it is positioned to the centre of gravity of the car body. This phenomenon is based on the fact that the lever arm of the inertia forces acting in the centre of gravity is not long enough to be able to sufficiently yield in a lateral direction on transverse shocks occurring at the axle aggregate or at the chassis.

These drawbacks are obviated by the present invention by positioning the centre of the gravity of the body and the longitudinal axis of oscillation of the car body at least approximately in a vertical plane, the axis being well below the centre of gravity. The axis of oscillation is preferably positioned substantially at the level of the road. The oscillation phenomenons occurring at the car body hereby are reduced to a minimum. The invention which may be employed in connection with front axles and rear axles is, however, particularly adapted for use in connection with the latter.

Preferably resilient bearings, for instance rubber bearings, are provided which besides allowing principally a resiliency to and fro from the longitudinal vehicle centre plane, simultaneously allow resiliency in other directions.

Moreover, it has been proved that the damping of transverse shocks and the exclusion of rocking phenomenons at the car body are the more effective, the lower the resilient bearings are arranged, i. e. the higher the centre of gravity of the car body is situated above the resilient bearings and, furthermore, the larger the angle is which is formed by the middle axes of the bearings arranged at both sides of the longitudinal middle plane of the vehicle, said middle axes being determined by the direction of smallest elasticity, the longitudinal axis of oscillation of the car body being determined by the point of intersection of said middle axes of the bearings. This angle preferably amounts to at least 60° if possible, however, to 90–120° or more.

In the accompanying drawing one construction according to the invention is diagrammatically shown by way of example.

The rear wheels $a$ are mounted upon oscillating half axles $b$ which are linked to the casing $c$ of the differential gear and the shocks of which are absorbed by suitable springs, such as the transverse leaf spring $d$ fixed to the casing. The upper surface of the casing $c$, serving as supporting body for the oscillating half axles, is provided with a curved bearing member $e$ upon which the car body $f$ is mounted by means of two or more plate- or ledge-like rubber supports or rubber bearings $g$, extending in the longitudinal direction of the vehicle and arranged at both sides of the longitudinal centre plane of the vehicle speed as far from each other as conveniently possible. The rubber supports or rubber bearings $g$ are arranged between the bearing member $e$ and the car body in such a manner that the directions of their smallest elasticity intersect each other in a point $0$ upon the road under an angle $\alpha$ of between 60° and 90°. The centre of gravity $s$ of the body $f$ is situated above the rubber bearings $g$.

A similar arrangement could also be provided for the front axles. However, the invention is of particular importance for gauge altering oscillating half axles.

Furthermore, the point $0$ could also be situated below or above the plane of the road. The construction shown, however, results in a particular favourable absorption of all forces and vibrations.

The rubber bearings may be connected in any other suitable manner to the parts to be united.

Having now particularly described and ascertained the nature of our said invention and in what manner the same is to be performed we declare that what we claim is:

1. A vehicle comprising a chassis, wheels mounted thereon, and a body provided with a lower concave curved portion, said chassis being provided with an upper convex curved portion spaced substantially uniformly below said curved portion of the body, spaced rubber supports for the body secured between said curved portions to both the body and chassis and arranged on opposite sides of the vertical centre plane of the vehicle at substantial distances therefrom.

2. A vehicle as set forth in claim 1 wherein said curved portions are arcuate with the radii of curvature of both curves centering at the same point located below the axis of said wheels and in a vertical plane centrally of the vehicle.

3. A vehicle as set forth in claim 1 wherein said curved portions are arcuate with the radii of curvature of both curves centering at the same point located a substantial distance below the normal center of gravity of the vehicle and in the same vertical plane therewith.

4. A vehicle as set forth in claim 1 wherein said curved portions are arcuate with the radii of curvature of both curves centering at the same point located at approximately the level of the road supporting the wheels.

5. A vehicle as set forth in claim 1 wherein the rubber supports are sheets of rubber arranged longitudinally of the vehicle and secured to both the body and chassis by fastening members arranged substantially radially of said curved portions.

6. A vehicle as set forth in claim 1, wherein the rubber supports are arranged at widely separated positions on opposite sides of the vertical plane of the center of gravity of the vehicle with the angle formed by the intersection of lines extended through the directions of their smallest elasticity being at least 60°, and the point of intersection located below the axis of said wheels.

KARL WILFERT.
BÉLA BARÉNYI.